United States Patent [19]
Wickham

[11] Patent Number: 5,195,227
[45] Date of Patent: Mar. 23, 1993

[54] QUICK CHANGE MOUNTING SYSTEM FOR MACHINE TOOLS

[75] Inventor: John L. Wickham, Glen Arm, Md.

[73] Assignee: The J. L. Wickham Co., Inc., Baltimore, Md.

[21] Appl. No.: 635,827

[22] Filed: Jan. 3, 1991

Related U.S. Application Data

[63] Continuation-in-part of Ser. No. 448,107, Dec. 13, 1989, abandoned.

[51] Int. Cl.$^5$ .............................................. B23Q 3/00
[52] U.S. Cl. .................................. 29/33 P; 269/309; 279/83; 483/901
[58] Field of Search .................... 29/568, 563, 33 P; 409/218, 220; 279/83, 132; 269/20, 309, 310; 483/901

[56] References Cited

U.S. PATENT DOCUMENTS

| | | | |
|---|---|---|---|
| 2,815,958 | 12/1957 | Minati | 279/132 |
| 4,110,898 | 9/1978 | Yamaoka et al. | 29/568 |
| 4,662,043 | 5/1987 | Stone et al. | 29/33 P |
| 4,678,077 | 7/1987 | Bertorello | 269/20 X |

*Primary Examiner*—Z. R. Bilinsky
*Attorney, Agent, or Firm*—Cushman Darby & Cushman

[57] ABSTRACT

A quick change mounting system for machine tools provides tool-carrying fixtures having a system-standard dimensional referencing system and fluidically controlled tooling to effect the desired machining operations. The tool-carrying fixtures are mounted to and dismounted from a system-standard tooling plate that carries fluidic supply conduits and mutually operative connectors that effect connection and disconnection of the fluidic system in response to the mounting or dismounting of the tool-carrying fixtures on its mounting plate. A change from one tool-carrying fixture to another can be accomplished by dismounting the former tool-carrying fixture from its mounting plate and mounting a replacement tool-carrying fixture. Since the tool-carrying fixtures have a common tooling plate and the mounting plate defines a system-standard mounting interface in which all dimensional relationships are preestablished, bench fabrication and set-up of each tool-carrying fixture is possible to minimize machine system down time and costs traditionally associated with tooling changeover and set-up.

7 Claims, 6 Drawing Sheets

QUICK CHANGE MOUNTING SYSTEM FOR MACHINE TOOLS

The present application is a continuation-in-part of applicant's co-pending and commonly assigned U.S. patent application Ser. No. 07/448,107, filed Dec. 13, 1989, now abandoned.

BACKGROUND OF THE INVENTION

The present invention relates to a quick change mounting system for machine tools in which tool-carrying fixtures are periodically changed and, more particularly, to a quick change system for changing hydraulically or pneumatically controlled tool-carrying fixtures in a time-efficient manner.

Systems for the manufacture of machined parts have historically been developed as a function of the volume of the parts to be produced. Where a large quantity of parts are to be manufactured in a continuous or near continuous manner, as occurs in the automotive industry, specialized machinery is developed for the machining and shaping of a particular part. In general, the development and capital equipment costs for such specialized machine systems is very high, although the initial costs can be amortized over the large volume of parts produced to result in lower overall piece-part costs when compared to other types of machining systems. While systems of this type are well-suited for large volume runs, their specialized design is such that they have a low adaptability for the manufacture of parts outside of their design specifications. Where machined parts are required in moderate volumes, as contrasted to high volumes, the design costs associated with dedicated or specially designed machine systems are prohibitive.

Various types of machining systems have been developed to meet the requirements for the moderate volume manufacture of machined parts. In these systems, tool-carrying fixtures are mounted on various types of spindles or plates and often include fluidically controlled tools, clamps, and other movable devices and members. Such machine systems oftentimes require periodic changing of the tool-carrying fixture when the production run of a first part is completed in order to changeover to a tool carrying fixture intended for the manufacture of a second type of machined part.

Substantial changeover and set-up time can be required to change tooling designed for the manufacture of a first part to tooling designed for the manufacture of another part. For example, the replacement tool-carrying fixture must be aligned in multiple axes and the fluid carrying lines connected to the fixture. While quick-disconnect couplings and flexible hoses have performed this function, it is not uncommon for hoses to be damaged during changeover and for the couplings to be contaminated with metal chips, cutting fluids, lubricants, and other debris associated with the machining operation. When the fluid supply system is so-contaminated, substantial disassembly operations are required to decontaminate the system.

SUMMARY OF THE INVENTION

In view of the above, it is an object of the present invention, among others, to provide a quick change mounting system for machine tools in which a fluidically controlled tool-carrying fixture can be removed from a mounting plate and replaced with another tool-carrying fixture with a minimum amount of down time.

It is still another object of the present invention to provide a quick change mounting system for machine tools in which a fluidically controlled tool-carrying fixture can be removed from a mounting plate and replaced with another tool-carrying fixture while maintaining precise three-dimensional alignment of the fluidically operated device.

It is a further object of the present invention to provide a quick change mounting system for machine tools which use system-standard tooling mounts having respective pre-established multi-coordinate reference points so that tool-carrying fixtures can be mounted in such a way that the dimensional relationship of the tooling to the work piece is pre-known to thus minimize tooling set-up time.

It is another object of the present invention to provide a quick change mounting system for machine tools in which a fluidically controlled tool-carrying fixture can be removed from a mounting plate and replaced with another tool-carrying fixture with a minimum probability of introducing contaminants into the fluid system.

In view of these objects, and others, the present invention provides a quick change mounting system for machine tools in which tool-carrying fixtures are provided with a system-standard dimensional referencing system and fluidically controlled tooling to effect the desired machining operations. The tool-carrying fixture is mounted on a system-standard tooling plate that carries fluidic supply conduits and mutually operative connectors that effect connection and disconnection of the fluidic system in response to the mounting or dismounting of the tool-carrying fixture on its mounting plate. A change from one tool-carrying fixture to another can be accomplished by dismounting the former tool-carrying fixtures from its mounting plate and mounting a replacement tool-carrying fixture. Since the tool-carrying fixtures have a common tooling plate and the mounting plate defines a system-standard mounting interface in which all dimensional relationships are pre-established, bench fabrication and set-up of each tool-carrying fixtures are possible to minimize machine system down time and costs traditionally associated with tooling changeover and set-up.

In a preferred embodiment, the tool-carrying fixture and its mounting plate each include complementary alignment members and pads that engage one another in a face-to-face relationship. Alignment collars are mounted about two of the alignment pads with one collar including curvilinear surfaces for engaging one of the alignment members to reliably establish a first mounting point. The other collar including a substantially flat mounting surface to establish another mounting point. Both sets of alignment members and pads are secured together by fasteners that provide force vectors to force the collars into engagement with their respective alignment members and to secure the tool-carrying fixture to its mounting plate. A pair of mutually engageable fluid couplers is associated with at least one corresponding pair of mounting pads with each fluid coupler connected to a hydraulic or pneumatic circuit to establish and interrupt, respectively, the fluid circuit when the tool-carrying fixture is mounted to its mounting plate and dismounted from its mounting pad. Each fluid coupler includes a valve body that is mounted in a suitable bore for reciprocal movement between a closed and an open position and includes an actuating tab that extends from its pad and which is operated by the actuating tab of a complementary fluid coupler to establish and interrupt fluid communications.

As can be appreciated, the standardized interfacing system between tool-carrying fixtures and their mounting plate and the automatic connection and disconnection of the fluidic systems upon mounting and dismounting a tool-carrying fixture with its mounting plate allows the tool-carrying fixtures to be bench assembled and set-up prior to mounting on the mounting plate. The system thus advantageously reduces down time and set-up time to minimize costs associated with tooling changeover.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
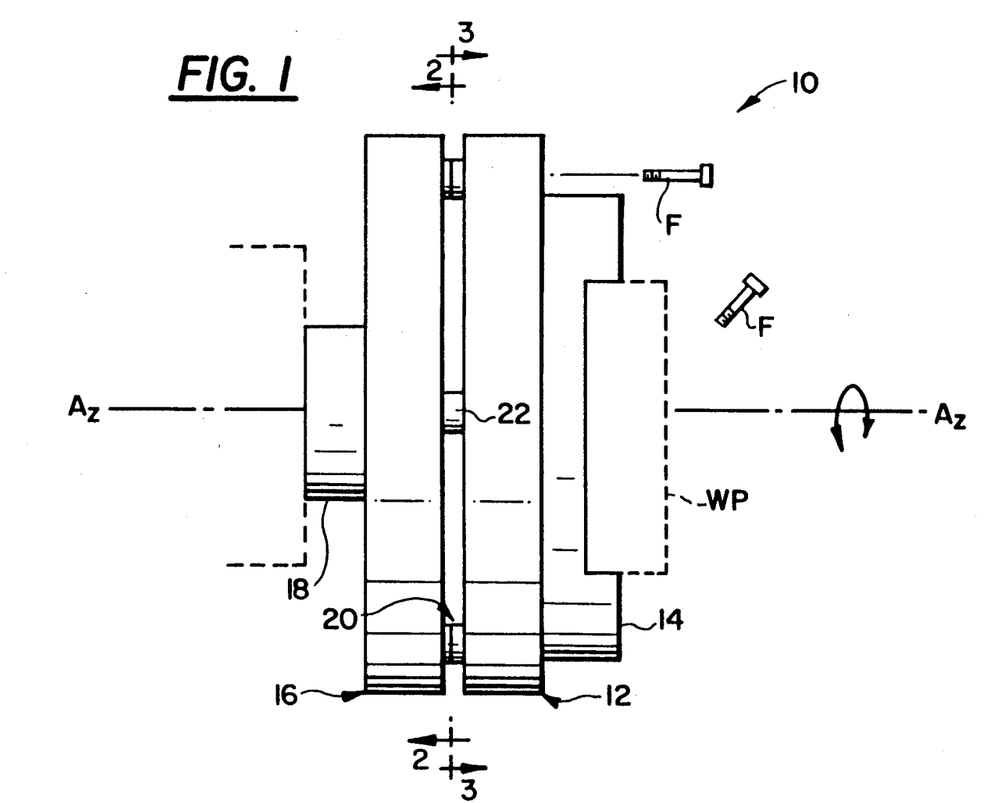
FIG. 1 is a side elevational view of a representative mounting plate and fixture wheel incorporating the quick change system of the present invention.

A quick change mounting system for machine tools in accordance with the present invention is shown in the context of a rotary indexer application in FIG. 1 and is designated generally therein by the reference character 10. As shown, a fixture wheel 12 is provided upon which fluidically controlled fixtures and tools (represented in a generic manner at 14) are mounted. The various fixtures and tools 14 are intended to fixture and operate upon a work piece WP (dotted-line illustration). The fixture wheel 12 can be mounted and dismounted from a mounting plate 16, which, in turn, is connected to a machine tool, such as the exemplary indexer (dotted-line illustration) of which only the spindle 18 is shown. The motion of the fixture wheel 12 as well as the various fluidically controlled devices on the fixture wheel 12 can be controlled by a suitable programmed machine controller (not shown). In the embodiment shown, the fixture wheel 12 and its mounting plate 16 are organized to rotate about an axis $A_z$, which axis is normal to a plane defined by axes $A_x$ and $A_y$ (not shown in FIG. 1). Representative fluid operated devices and tools include the fluid operated fixture system of commonly assigned U.S. Pat. No. 4,687,799 issued Oct. 6, 1987 and the fluidically controlled tap of commonly assigned U.S. Pat. No. 4,740,120 issued Apr. 26, 1988.

In the application illustrated in FIG. 1, the fixture wheel 12 and its mounting plate 16 are rotated about the axis $A_z$, and stopped quickly to reposition the work piece WP relative to other machine tools. Since the fixture wheel 12 and any components mounted thereon can have a total weight of up to five-hundred kilograms, it is critical that the connection interface between the fixture wheel 12 and its mounting plate 16 be torsionally rigid so that various dimensional relationships will not be disturbed by repeated repositioning of the fixture wheel 12 about the axis $A_z$. Additionally, it is desirable that the connection interface be such that the fixture wheel 12 can be readily dismounted from the mounting plate 16 without significant variation in the various dimensional relationships, that is, the connection interface should have a high repeatability in terms of its dimensional relationships with successive mountings and dismountings.

The fixture wheel 12 and its mounting plate 16 are connected through a connection interface defined by complementary sets 20 of mounting pads and alignment assemblies 22, described more fully below, which effect the 3-axis dimensional interconnection and effect connection of any pneumatic or hydraulic circuits when mounting the fixture wheel 12 to the mounting plate 16 and, conversely, disconnection of the fluid circuits when dismounting the fixture wheel 12. The fixture wheel 12 and the mounting plate 16 are secured together by threaded fasteners, indicated generally at F, which cooperate with the mounting pad sets 20 and the alignment assemblies 22.

As shown in the complementary perspective views of the separated mounting plate 16 (FIG. 2) and the fixture wheel 12 (FIG. 3), the fixture wheel 12 and the mounting plate 16 are generally circular members with the rear face of the fixture wheel 12 (FIG. 3) including four mounting pads $P_1$, $P_2$, $P_3$, and $P_4$ equi-positioned about the axis $A_z$ adjacent the periphery of the fixture wheel 12. The mounting pads $P_1$, $P_2$, $P_3$, and $P_4$ are generally cylindrical and present a flat, generally circular end face that extends a selected distance rearwardly of the rear face of the fixture wheel 12. In a similar manner, the mounting plate 16 (FIG. 2) includes four complementary mounting pads $P_1'$, $P_2'$, $P_3'$, and $P_4'$ equi-positioned about the axis $A_z$ at substantially the same radius and position as the mounting pads $P_1$, $P_2$, $P_3$, and $P_4$. The mounting pads $P_1'$, $P_2'$, $P_3'$, and $P_4'$ are generally cylindrical and have a diameter about the same as their respective complementary mounting pads $P_1$, $P_2$, $P_3$, and $P_4$ and present a circular end face similar to that of the end faces presented by the mounting pads $P_1$, $P_2$, $P_3$, and $P_4$. The various mounting pads $P_n$ and $P_n'$ are dimensioned so that their end faces cooperatively define an X,Y plane that is orthogonal to the axis $A_z$. While not specifically shown in FIGS. 2 and 3, the various mounting pads $P_n$ and $P_n'$ include throughbores and/or threaded bores for accommodating the connection fasteners F. When the various mounting pads $P_n$ and $P_n'$ are mated together in end face to end face contact and the fixture wheel 12 and mounting plate 16 secured to one another, the cooperating surfaces of the various mounting pads $P_n$ and $P_n'$ will accurately establish the X,Y plane. As can be appreciate by those skilled in the art, single set of mounting pads on only one of the confronting surfaces can be used to establish the desired X,Y plane.

Figure 2:
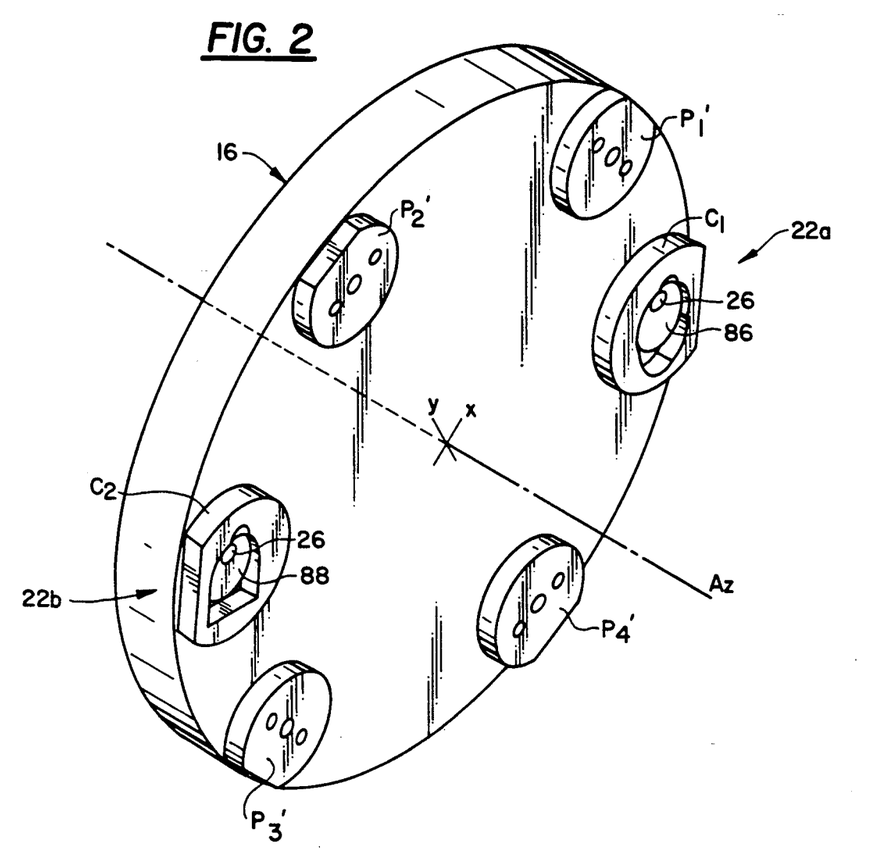
FIG. 2 is a front perspective view of the mounting plate of FIG. 1 taken along line 2—2 of FIG. 1.
Figure 3:
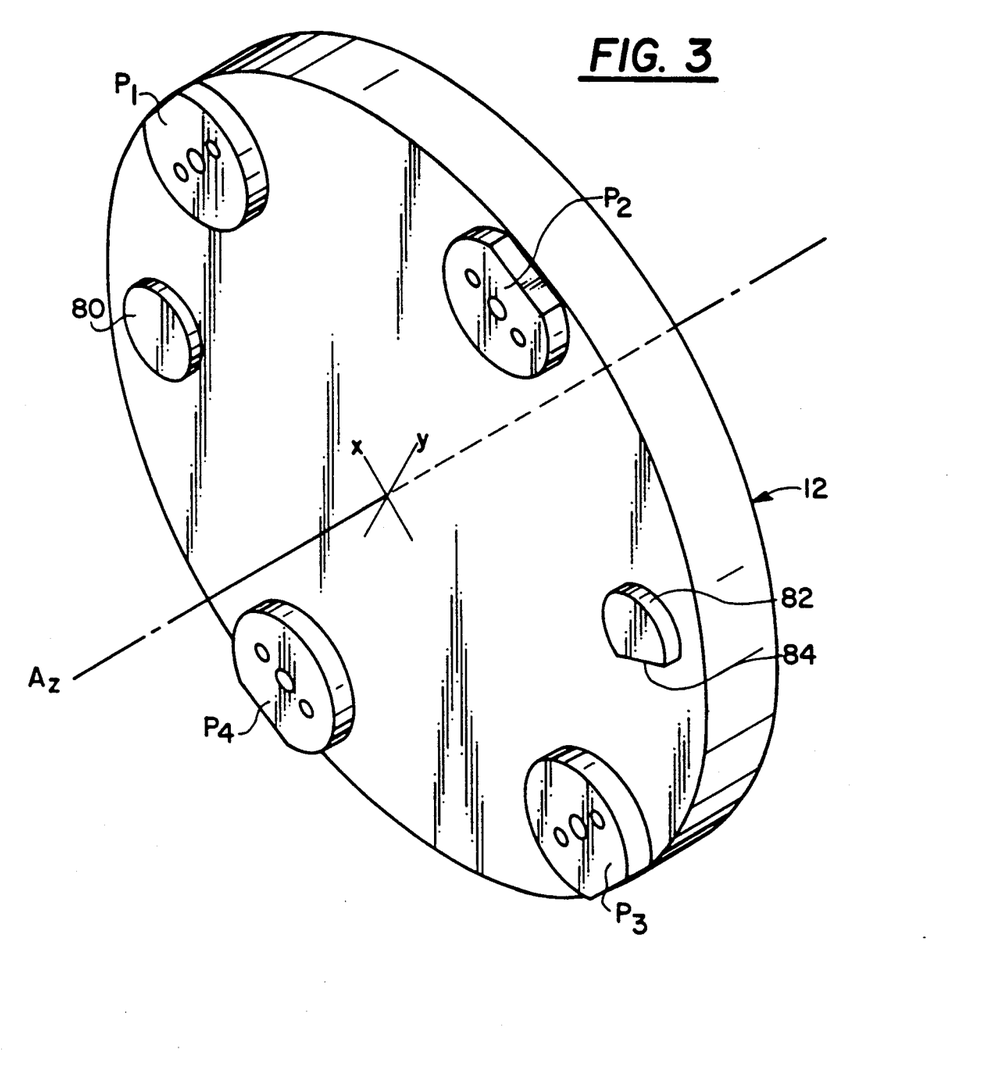
FIG. 3 is a rear perspective view of the fixture plate of FIG. 1 taken along line 3—3 of FIG. 1.

As shown in FIGS. 2 and 3 and as explained below, the alignment assemblies, indicated generally at 22 in FIG. 1, are defined by cooperating alignment members, collars, and pads on the confronting surfaces of the fixture wheel 12 and the mounting plate 16.

As shown in FIGS. 2-7, a first alignment assembly 22a includes a generally cylindrical alignment member 80 secured to and extending rearwardly of the rear face of the fixture wheel 12 to present a flat, generally circular end face in a plane that is either coincident with or parallel to the X,Y plane established by the various mounting pads $P_n$ and $P_n'$ described above. In a similar manner, a second alignment assembly 22b includes a generally cylindrical alignment member 82 secured to and extending rearwardly of the rear face of the fixture wheel 12 to present a flat end face in a plane that is also either coincident with or parallel to the X,Y plane established by the various mounting pads $P_n$ and $P_n'$ described above. As shown in FIG. 3 and the detail of FIG. 7, the alignment member 82 is provided with a chordal flat 84. In general, the alignment members 80 and 82 are mounted on opposite sides of the axis $A_z$, preferably on or adjacent a diameter line. As explained below, the alignment members 80 and 82 cooperate with the other components of their respective alignment assemblies 22a and 22b to accurately position the fixture wheel 12 about the $A_z$.

As shown in FIGS. 2 and 5-7, a generally cylindrical alignment pad 86 is secured to and extends forwardly of the front face of the mounting plate 16 to present a flat, generally circular end face in a plane that is either coincident with or parallel to the X,Y plane established by the various mounting pads $P_n$ and $P_n'$ described above. In a similar manner, the second alignment assembly 22b includes a generally cylindrical alignment pad 88 secured to and also extending forwardly of the front face of the mounting plate 16 to present a flat end face in a plane that is also either coincident with or parallel to the X,Y plane established by the various mounting pads $P_n$ and $P_n'$ described above. The alignment pads 86 and 88 are mounted on opposite sides of the axis $A_z$, so that at least portions of the end faces of the complementary alignment members 80 and 82 will engage one another in the X,Y plane. In the preferred embodiment, the X,Y plane is primarily established by the mounting pads $P_n$ and $P_n'$, as described above, with the complementary end faces of the alignment members 80 and 82 and the respective alignment pads 86 and 88 assisting in the establishment of the X,Y plane.

Figure 5:
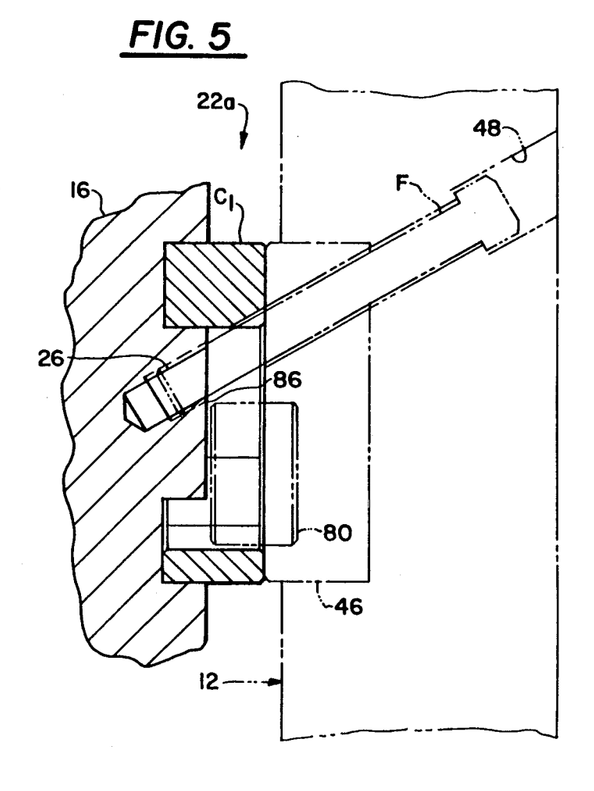
FIG. 5 side elevational view, in cross-section, of a portion of an alignment assembly mounted on the rear surface of the fixture wheel (dotted-line illustration) in engagement with a complementary portion mounted on the forward surface of the mounting wheel.
Figure 6:
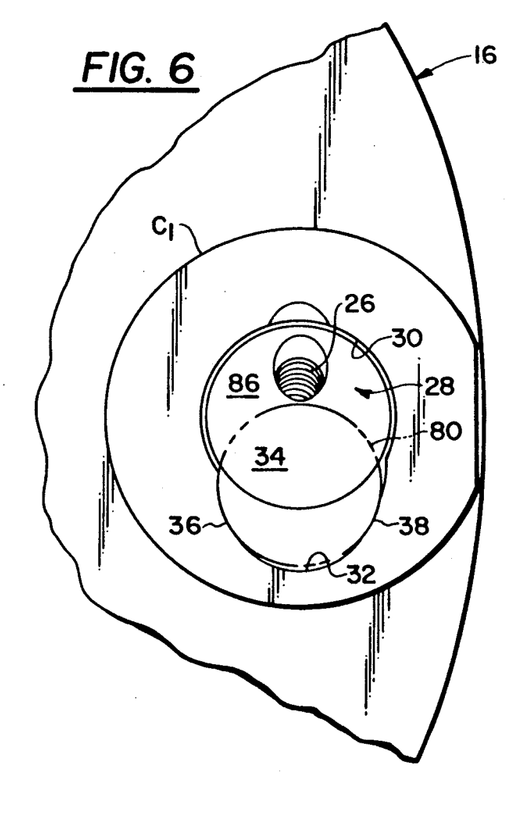
FIG. 6 is a frontal view of an alignment collar and connection pad associated with the alignment assembly of FIGS. 4 and 5.

As shown in FIGS. 2, 5, and 6, a first alignment collar $C_1$ is positioned about the alignment pad 86 and another alignment collar $C_2$ (FIG. 7) is positioned about the alignment pad 88. Each alignment collar $C_1$ and $C_2$ extends forward of the end faces of their respective alignment pads 86 and 88 in order to receive their corresponding alignment members 80 and 82. As explained below in relationship to FIGS. 6 and 7, the alignment collars $C_1$ and $C_2$ cooperate with their complementary alignment members 80 and 82 to establish, with a high degree of accuracy, the dimensional relationships between the fixture wheel 12 and the mounting plate 16 about the axis $A_z$ in such a way that the relationship remains very stable with repeated mountings and dismountings of the fixture wheel 12 to and from the mounting plate 16.

As shown in FIG. 6, the preferred embodiment of the alignment collar $C_1$ includes an irregularly shaped opening, indicated generally at 28, which surrounds the alignment pad 86 and which is designed to receive the complementary alignment member 80 (dotted-line illustration). The opening 28 includes a first, upper portion having a diameter greater than that of the alignment pad 86 and defined by a surface 30, a second, lower opening having a diameter somewhat greater than that of the alignment pad 86 and defined by a surface 32, and, lastly, an intermediate opening 34 defined by curvilinear journal surfaces 36 and 38 that are formed at the diameter of the alignment member 80 that is received by the alignment collar $C_1$. The opening 28 can be formed, for example, by boring the opening 34 at the diameter D of the alignment member 80, removing a portion of the material to define the lower portion between the surfaces 36 and 38, and removing additional material to define the upper portion of the opening 28 above and between the surfaces 36 and 38. The size and shape of the lower opening is not particularly critical, but sufficient material should be removed so that the alignment member 80 is journalled on the surfaces 36 and 38. In a similar manner, the size and shape of the upper opening is not particularly critical, but should be sufficiently large to allow entry of the alignment member 80. If desired, the upper portion of the opening 28 defined by the surface 30 need not be closed, that is, an upwardly open U-shaped opening can be defined. Additionally, the transition between the surfaces 30 and 32 and the surfaces 36 and 38 can be radiused to eliminate any sharp edges. In general, the journal surfaces 36 and 38 should each subtend an arc of about 45 degrees and be formed on the same side of the diameter line so that the cylindrical outer surface of the alignment member 80 can be journalled to the surfaces 36 and 38. In this latter case, the surface 32 subtends an arc of about 90 degrees.

Figure 7:
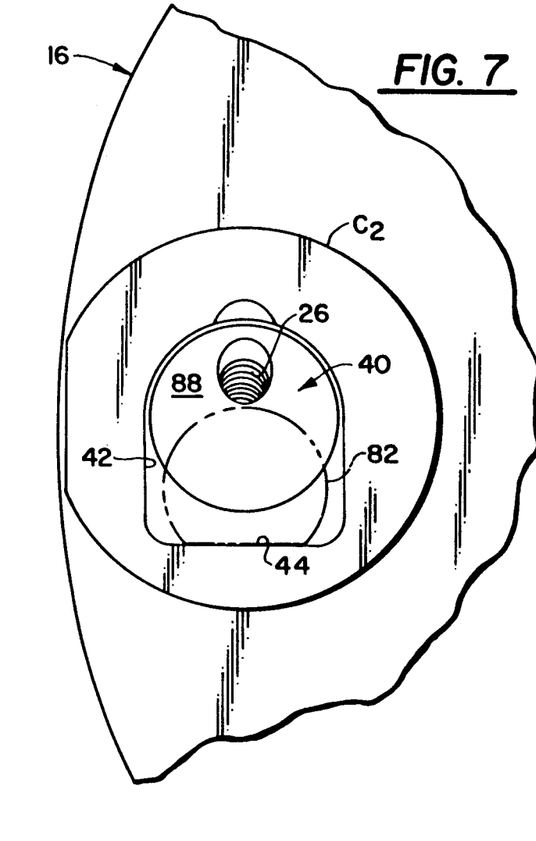
FIG. 7 is a frontal view of an alignment collar and connection pad associated with the alignment assembly of FIG. 1.

As shown in FIG. 7, the alignment collar $C_2$ includes an opening, indicated generally at 40, which surrounds the alignment pad 88 and which is designed to receive the complementary alignment member 82 on the rear face of the fixture wheel 12. The opening 40 includes an upper portion having a side-to-side dimension greater than the diameter of the alignment member 82 and defined by surface 42 and a lower portion terminated by a transverse flat surface 44 that is designed to engage the flat surface 84 of the alignment member 82. As in the case of the opening 28 of the collar $C_1$, the opening 40 of the collar $C_2$ need not be closed and can be an upwardly opened U-shape.

The fixture wheel 12 is mounted to the mounting plate 16 by aligning the mounting pads $P_1$, $P_2$, $P_3$, and $P_4$ with their respective mounting pads $P_1'$, $P_2'$, $P_3'$, and $P_4'$ with the alignment members 80 and 82 aligned to be received by their respective alignment collars $C_1$ and $C_2$. The parts are then brought together so that the end faces of the various mounting pads $P_n$ and $P_n'$ engage one other in a face-to-face relationship and the alignment members 80 and 82 enter and are received by their respective alignment collars $C_1$ and $C_1$ with the end faces of the alignment members 80 and 82 and the alignment pads 86 and 88 engaging one another to assist in establishing the X,Y plane relative the axis $A_z$. In the case of the alignment collar $C_1$, the complementary alignment member 80 preferably enters the uppermost portion of the opening 28 and, in the case of the alignment collar $C_2$, the complementary alignment member 82 enters the upper portion of the opening 40 above the flat 44.

Figure 4:
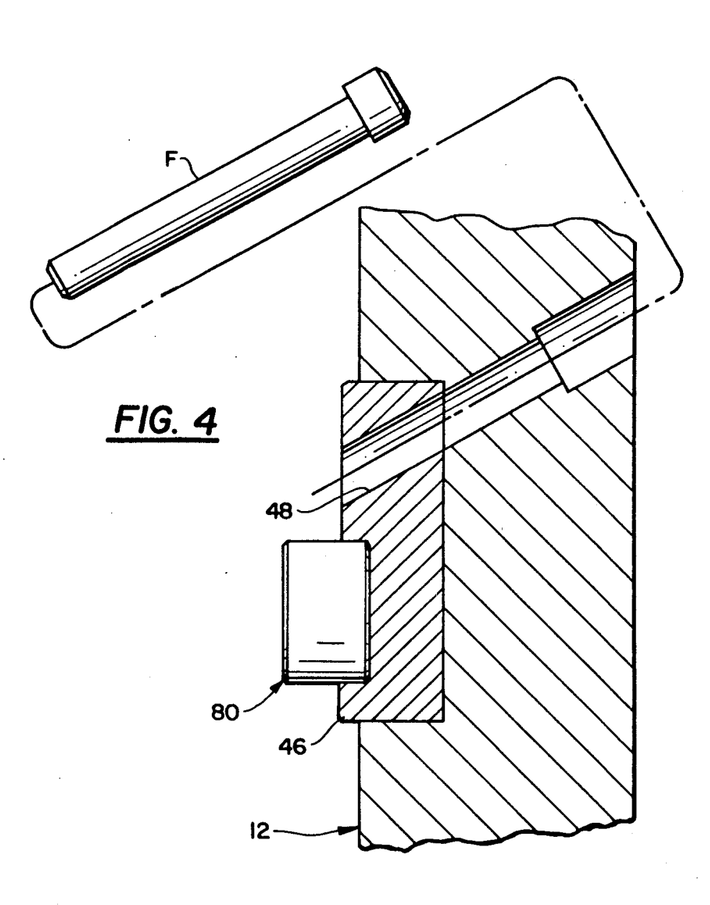
FIG. 4 is a side elevational view, in cross-section, of a portion of an alignment member mounted on the rear surface of the fixture wheel.

As shown in a representative manner in FIG. 4, the alignment member 80 is carried in an insert 46 that is recessed into the rear face of the fixture wheel 12. A clearance bore 48 (dotted-line illustration) is provided in the fixture wheel 12 for accepting a threaded fastener F which engages the threaded bore 26 (FIG. 5) of the alignment pad 86. The alignment member 82, which includes the chordal flat 84, is insert-mounted in a manner similar to that described for the alignment member 80 an also includes a fastener-receiving bore (not shown) that receives a threaded fastener F. As the components are joined together, a first threaded fastener F is inserted into its clearance bore 48 to engage the threaded bore 26 of the alignment pad 86 and a second threaded fastener F is inserted into its clearance bore to engage the threaded bore 26 of its alignment pad 88. As the threaded fasteners F are tightened to draw the aligned member and pads together, the tensioned threaded fasteners F provide resolved forces in the direction of the axis $A_z$ to draw the parts together, end face to end face, and another resultant force to draw the cylindrical surface of the alignment member 80 toward and into contact with the contact surfaces 36 and 38 of the alignment collar $C_1$. In a similar manner, the alignment member 82 enters the opening 40 and, when its threaded fastener (not shown) is tightened, the end faces of the alignment pad 88 and the alignment member 82 are drawn together with the flat 84 (FIG. 7) on the alignment member 82 engaging the flat 44 of the alignment collar $C_2$. It is important that the threaded fastener F that causes the engagement of the alignment member 80 and its collar $C_1$ be tightened first. Once the threaded fasteners F that secure the alignment members 80 and 82 with their respective alignment pad 86 and 88 are tightened, additional threaded fasteners F (FIG. 1) are used to further secure the fixture wheel 12 and the mounting plate 16 together.

It is preferred that the alignment member 80 be journalled to its support surfaces 36 and 38, which effectively define a 2-surface mount of the alignment member 80. The presence of the clearance surface 32 allows for the accumulation of contaminants that could affect mounting accuracy. The so-journalled alignment member 80 functions to define a precisely located pivot axis or pivot point with the fixture wheel 12 and the mounting plate 16 angularly related about that pivot axis. The alignment member 82 and its cooperating alignment collar $C_2$ then serve as a stop surface to establish the angular relationship of the fixture wheel 12 relative to that pivot axis and thus define a 3-surface mount that establishes the angular relationship of the fixture wheel 12 and its mounting plate 16 about the axis $A_z$.

The resulting connection interface possesses exceptional torsional rigidity and maintains its assembled dimensional relationships when subjected to repeated start-and-stop repositioning of the mounting plate 16 and its fixture wheel 12 about the axis $A_z$. More specifically and in the context of FIGS. 1–7, when the connected mounting plate 16 and fixture wheel 12 are rotated in the clockwise direction and abruptly halted, any momentum forces about the axis $A_z$ will increase the tension in the threaded fastener securing the alignment member 82 and its alignment collar $C_2$ together, and concurrently, force the cylindrical surfaces of the alignment member 80 against the journal surfaces 36 and 38 of the alignment collar $C_1$. As long as the tension in the threaded fastener securing the alignment member 82 and its alignment collar $C_2$ together does not rise above its elastic strain limit or yield point, the parts will retain their dimensional stability when halted after rotation in the clockwise direction. Conversely, when the connected mounting plate 16 and fixture wheel 12 are rotated in the counter clockwise direction and abruptly halted, any momentum forces about the axis $A_z$ will increase the tension in the threaded fastener securing the alignment member 80 and its alignment collar $C_1$ together and, concurrently, force the flat surface 84 of the alignment member 82 against the flat surface 44 of the alignment collar $C_2$. As long as the tension in the threaded fastener securing the alignment member 80 and its alignment collar $C_1$ together does not rise above its elastic strain limit or yield point, the parts will retain their dimensional stability when halted after rotation in the counter clockwise direction.

As can be appreciated by those skilled in the art, the system can be designed so that the alignment collars $P_1$ and $P_2$ are mounted on the rear face of the fixture wheel 12.

In addition to providing substantial torsional rigidity, the connection interface also represents a simple-to-assemble structure by which relatively unskilled workers can effect mounting and dismounting while maintaining dimensional repeatability to a few ten-thousandth of an inch. In contrast, those interfaces which utilized pilot bore and spindle-type mounts require careful cleaning prior to assembly and careful alilgnment of the mating parts and a conscious effect to avoid misalignment or jamming during mating.

Figure 8:
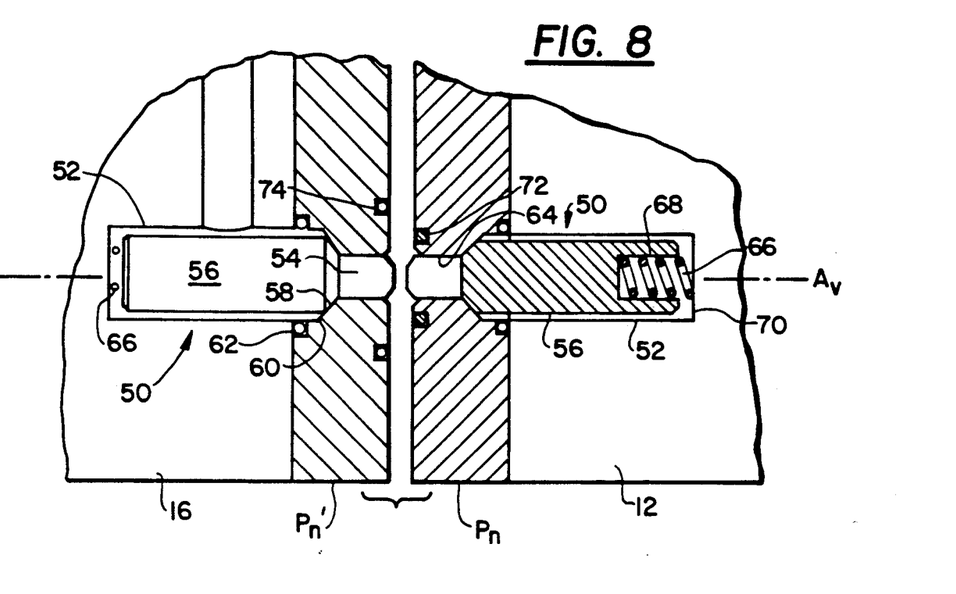
FIG. 8 is an enlarged elevational view, in partial cross section, of a fluidic coupler of the fixture wheel in engagement with its complementary fluid coupler in the mounting plate to effect fluid communication between the two components.

The connection interface also includes mutually engageable and co-acting fluid connectors that automatically establish a fluid circuit when the fixture wheel 12 and the mounting plate 16 are mounted to one another and which interrupt the fluid circuits when the parts are dismounted. As shown in FIG. 8, mounting pad $P_n'$ is received in a suitable counterbore or recess (unnumbered) formed in the forward face of the mounting plate 16 and retained in place by suitable threaded fasteners (not shown). A fluid coupler, generally indicated t 50, is carried in a suitable bore 52 formed in the mounting plate 16 and, as explained below, is connected to a hydraulic or pneumatic controller through various conduits in the mounting plate 16 to an external pressurized fluid source (not shown). An actuator tab 54 extends from the end face of the mounting pad $P_n'$ and is movable between an extended position (solid-line illustration) and a depressed or retracted position. The complementary mounting pad $P_n$ includes another fluid coupler 50 mounted in the fixture wheel 12. The two complementary fluid couplers 50 are similarly organized and designed to mate with one another to effect a fluid connection between the fixture wheel 12 and the mounting plate 16.

Each fluid coupler 50 includes a valve body 56 that is mounted in the bore 52 for reciprocal movement between a closed and an open position. The valve body 56 is concentrically formed as a cylinder along a valve actuation axis $A_v$ and includes a frusto-conical valve surface 58 and the actuating tab 54 which extends along the valve actuation axis $A_v$. The mounting pad $P_n'$ includes a counterbore having a valve seat 60 defined by a conical surface that is designed to contact and seal against the valve surface 58 of the valve body 56. The mounting pad $P_n'$ is sealed against its mounting surface by an O-ring 62. A reduced-diameter throughbore 64 is provided along the valve axis $A_v$ through which the actuating tab 54 extends. The valve body 56 is resiliently biased into its closed position by a helical compression spring 66 contained within a counterbore 68 formed in the valve body 56 and which engages the bottom wall 70 of the bore 52 to force the valving surface 58 of the valve body 56 against the valve seat 60. The actuating tab 54 of each fluid coupler 50 extends along the valve actuation axis $A_v$ so that it extends a predetermined distance beyond the surface of its pad surface; in general, the distal end of the actuation tab 54 extends 0.050 to 0.150 of an inch (viz., 1.25 to 3.8 mm.) from the local pad surface. The remote end of the actuation tab 54 preferably has a frusto-conical configuration, and, if desired, the actuating tab 54 can be formed as a separate threaded component that is advanced into or retracted from the valve body 56 to effect the desired extension from the surface defined by the mounting pad $P_n'$. Additionally, an overcap (not shown) can be provided that is in threaded engagement with the actuating tab 54 to allow a measure of dimensional adjustment. An O-ring 72 is provided in a suitable annular counterbore about the actuating tab 54 to fluidically seal the mounting pads $P_n'$ when the fixture wheel 12 is mounted to the mounting plate 16. A second O-ring 102 may be provided to effect a redundant seal. The outside diameter surface of the actuating tabs 54 is provided with flutes or flattened surfaces to define a flow channel(s) about the periphery of the actuating tabs 54 to provide a flow passageway between the couplers.

The fluid couplers 50 are designed to establish fluid communication between the fluid passageway of the mounting plate 16 and those of the fixture wheel 12 when these components are mounted together and to interrupt or disconnect the fluid passageways when the two components are dismounted. When the fixture wheel 12 and the mounting plate 16 are dismounted, the valve body 56 of each fluid coupler 50 is resiliently biased by its spring 66 to a closed position, that is, the valve surface 58 of each valve body 56 is in engagement with valve seat 60 to effectively close the fluid coupler 50 and prevent loss of the fluid and block the entry of any contaminants. As the fixture wheel 12 and the mounting plate 16 are mounted to one another as described above, the mounting pads $P_n'$ on the forward surfaces of the mounting plate 16 engage those on the rearward surfaces of the fixture wheel 12, the actuator tabs 54 of the complementary fluid couplers 50 are co-aligned along the valve axis $A_v$. As the mounting pads $P_n'$ are brought into face-to-face engagement, the actuating tabs 54 engage one another to force their respective valve bodies 56 toward their respective open positions, that is, to move the valve surfaces 58 from the valve seats 60 to open the respective fluid passages and establish the fluid circuit between the fixture wheel 12 and the mounting plate 16. In addition to the establishment of the fluid circuit, the mounting plate 16 is accordingly aligned in the $A_z$, $A_x$, and $A_y$ axes as described above in relation to FIGS. 1-7. As can be appreciated, it is desirable that the spring constant of the biasing springs 66 be substantially equal to one another although the axial length of the valve body 56 is selected so that at least one of the valve bodies 56 will 'bottom' on the end wall 70 to assure opening of the other valve body 56.

Figure 9:
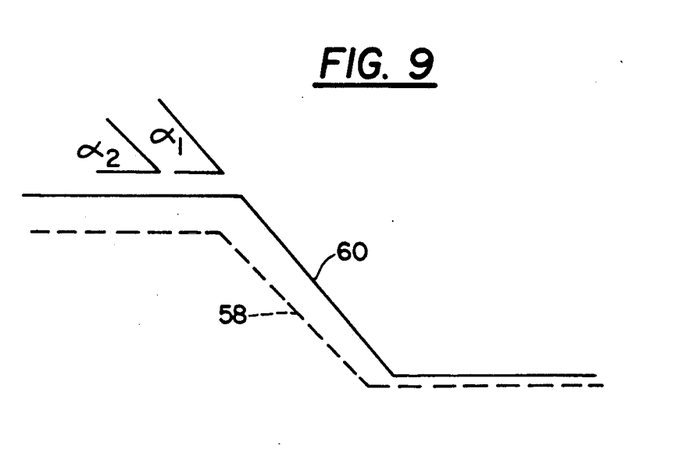
FIG. 9 is an enlarged detail view of a valving body and its sealing surfaces in a closed position (solid-line illustration) and its opened position (dotted-line illustration).

As shown in FIG. 9, the half-angle of the valve seat 60 $\alpha_1$ can be made slightly greater than the half-angle $\alpha_2$ of the valve surface 58 to assist in establishing a tapered-fit seal.

The present invention advantageously provides a quick change mounting system for machine tools and has a number of advantages over prior systems. The mounting and mounting pads arrangements provide exceptionally stiff mountings while the fluid couplers provide automatic connection and disconnection of the fluidic circuits upon mounting and dismounting. The present invention eliminates both the time necessary to effect connection and disconnection of the fluid circuits and eliminates problems associated with unsecured hoses and the opportunity for contamination of the fluid system.

As will be apparent to those skilled in the art, various changes and modifications may be made to the illustrated quick change mounting system for machine tools of the present invention without departing from the spirit and scope of the invention as determined in the appended claims and their legal equivalent.

What is claimed is:

1. A connection interface for mechanically mounting a fixture to a cooperating mounting member rotatable about an axis of rotation, comprising:

cooperating surface means on the fixture and the mounting member to define a common plane therebetween, the common plane orthogonal relative to the axis of rotation;

a first alignment member having a cylindrical surface portion thereof, said first alignment member on a one of the fixture and the mounting member;

first and second spaced bearing surfaces on the other of the fixture and the mounting member for journalling the cylindrical surface portion of said first alignment member, the fixture and the mounting member rotatable relative the other about an axis established by said journalled first alignment member;

a second alignment member spaced from said first alignment member and having a flat surface thereon, said second alignment member on a one of the fixture and the mounting member;

a flat surface on the other of said fixture and mounting member for engaging the flat surface of said second alignment member to fix the relative rotatable relationship between said journalled surfaces;

first fastener means for maintaining forcible engagement between said journalled surfaces; and second fastener means for maintaining forcible engagement between said flat surfaces.

2. The connection interface of claim 1, wherein said cylindrical surface portion of said first alignment member is formed at a selected radius and said first and second spaced bearing surfaces are formed at substantially the same radii as said selected radius.

3. The connection interface of claim 1, wherein both of said flat surfaces are formed in a plane not parallel to said common plane.

4. The connection interface of claim 3, wherein both of said flat surfaces are formed in a plane not parallel to said common plane.

5. The connection interface of claim 1, wherein said cooperating surface means comprises:

at least three co-planar surfaces on said fixture and respective cooperating co-planar surfaces on said mounting member, the cooperating co-planar members of said fixture and mounting member defining the common plane therebetween.

6. The connection interface of claim 1, further comprising:

a fluid coupler connected to the fixture and another fluid coupler connected to the mounting member, the first and other fluid coupler mutually engaging one another to establish a fluid connection therebetween as the fixture is mounted to the mounting member and interrupting the fluid connection when the fixture is dismounted from the mounting member.

7. The connection interface of claim 6, wherein each of said fluid couplers comprises:

a valve body having a sealing surface thereon for engaging a valve seat to interrupt the fluid connection, and means for resiliently biasing said valve body and its sealing surface into said valve seat to interrupt the fluid connection, said valve body having an actuation surface whereby contact with the actuation surface of another valve body displaces said valve body and its sealing surface from its valve seat to establish the fluid connection.

* * * * *